(12) United States Patent
Naka

(10) Patent No.: US 6,628,901 B2
(45) Date of Patent: Sep. 30, 2003

(54) CAMERA

(75) Inventor: Yoji Naka, Saitama (JP)

(73) Assignee: Fuji Photo Film Co., LTD, Kanagawa (JP)

(*) Notice: Subject to any disclaimer, the term of this patent is extended or adjusted under 35 U.S.C. 154(b) by 0 days.

(21) Appl. No.: 10/227,953

(22) Filed: Aug. 27, 2002

(65) Prior Publication Data

US 2003/0044179 A1 Mar. 6, 2003

(30) Foreign Application Priority Data

Aug. 31, 2001 (JP) ........................................ 2001-263278
Jul. 16, 2002 (JP) ........................................ 2002-206746

(51) Int. Cl.$^7$ ............................................. G03B 17/02
(52) U.S. Cl. ...................... 396/301; 396/448; 396/502; 396/543
(58) Field of Search ................................ 396/301, 448, 396/502, 503, 543

(56) References Cited

U.S. PATENT DOCUMENTS 4,198,149 A * 4/1980 Nomura et al. ............. 396/503

FOREIGN PATENT DOCUMENTS

| JP | 11-258670 | 9/1999 | ........... G03B/17/02 |
| JP | 2000-347270 | 12/2000 | ........... G03B/17/02 |

* cited by examiner

Primary Examiner—W. B. Perkey
(74) Attorney, Agent, or Firm—Young & Thompson

(57) ABSTRACT

A power source is turned on by pivoting of an operation protrusion of a power source dial which protrudes further than a cylindrical outer edge of a grip section, and a shutter button is provided in a position closer to a front side of the camera than a pivoting center of the power source dial and pivots on the pivoting center of the power source dial so as to be pushed down.

6 Claims, 7 Drawing Sheets

CAMERA

BACKGROUND OF THE INVENTION

1. Field of the Invention

The present invention relates to a camera for photographing in response to a photographing operation.

2. Description of Related Art

Conventionally, a camera, which has a shutter button which is provided on an upper surface of the camera and is pushed down at the time of photographing and a power source switch which is provided on a back surface of the camera and turns on/off a power source, is known. However, in such a camera, since the shutter button and the power source switch are arranged on the upper surface and the back surface of the camera independently, there arises a problem as to improvement in operability and miniaturization. In order to solve this problem, one suggestion is made in Japanese Patent Application Laid-Open No. 11-258670 (1999).

FIG. 7 is an appearance perspective view that the camera suggested in Japanese Patent Application Laid-Open No. 11-258670 (1999) is viewed from a direction where its back surface and upper surface appear.

The upper surface of the camera 100 shown in FIG. 7 is provided with a setting dial 102, a shutter button 103 provided on a center portion of the setting dial 102, a dial indicating section 104, and a lock releasing button 105 for releasing lock of the setting dial 102. The setting dial 102 has an off position for turning off a power source of the camera 100, and a plurality of setting mode positions for setting modes necessary for a photographing operation.

The back surface of the camera 100 is provided with a finder eyepiece window 106, a liquid crystal display section 107, setting operation buttons 108, 109 and 110 for executing setting other than the setting by means of the setting dial 102.

In this camera 100, since shutter button 103 and the setting dial 102 which serves as a power source switch are provided on the upper surface of the camera 100, the camera can be easily operated and miniaturized in comparison with a camera in which a shutter button and a power source switch are provided on an upper surface and a back surface, independently.

However, in the above-mentioned camera 100, since the shutter button 103 is provided to the center portion of the setting dial 102 which protrudes to a backward direction of the upper surface of the camera 100 (the side of the back surface of the camera 100), a position of a finger for pushing down the shutter button 103 is a backward side of the camera 100. For this reason, in the case where the camera 100 is miniaturized, there arises a problem that it is difficult to push down the shutter button 103. Moreover, when the power source is turned on/off, the setting dial 102 is moved by a finger along a straight ridgeline of an outer edge of the camera 100, there arises a problem that the operation is difficult.

In addition, Japanese Patent Application Laid-Open No. 2000-34720 also suggests a technique for performing both on/off operation of the power source and shutter releasing operation on an upper surface of a camera. This publication discloses a shutter button which also performs the power source on/off operation. A member, which performs the original function of the shutter button when it is pushed down in the state that the power source is on, is energized to a lateral direction by a spring, and every time when the member is once slid to the lateral direction against the spring energizing so that the power source is turned on and off alternatively.

However, in the case of the technique disclosed in Japanese Patent Application Laid-Open No. 2000-34720, since the shutter release and the on/off operation of the power source are performed by one member although operating directions are different, there is a fear that although the power source is intended to be turned off, the shutter is accidentally released or on the contrary, although the shutter is intended to be released, the power source is turned off and a chance to push the shutter button is missed.

In addition, similarly to the case of the camera which is shown in FIG. 7 and disclosed in above-mentioned Japanese Patent Application Laid-Open No. 11-258670 (1999), in the technique disclosed in Japanese Patent Application Laid-Open No. 2000-34720, the shutter button is provided at the center portion on the front-rear direction on the upper surface of the camera, and when the camera is miniaturized, there is a problem that it is difficult to push down the shutter button.

SUMMARY OF THE INVENTION

The present invention is devised in order to solve the above problems and it is an object of the present invention to provide a camera with a high photographing operation.

A camera of the present invention which achieves the above object for photographing in response to a photographing operation, includes: a power source dial provided on an upper surface of the camera for turning on/off a power source upon a pivoting operation; and a shutter button surrounded by the power source dial and provided in a position closer to a front side of the camera than a pivoting center of the power source dial, the shutter button pivoting on the pivoting center of the power source dial upon the pivoting of the power source dial.

In the camera of the present invention, since the shutter button is provided in the position closer to the front side of the camera than the pivoting center of the power source dial, a position of a finger for pushing down the shutter button is a front side of the camera, so that the shutter button can be easily pushed down even in the case of a small camera. Therefore, a shake which easily occurs in a small camera can be reduced.

Here, preferably the camera is provided with a shutter release member which is affected by pushing-down of the shutter button when the power source dial is pivoted to a power source-on position, and free from the effect due to the pushing-down of the shutter button when the power source dial is pivoted to a power source-off position.

When such a shutter release member is provided, shutter lock at the time of disuse can be realized without a special lock mechanism.

In addition, it is preferable that an approximately cylindrical grip section which extends up and down is provided, and the power source dial is arranged on an upper surface of the grip section, and the power source dial has an operation protrusion which protrudes further than a cylindrical outer edge of the grip section and rotates the power source dial.

With such a grip section and power source dial, when a finger is moved along a ridgeline of an upper end of the grip section, catch between the finger and the operation protrusion is maintained naturally and continuously, and releasing of the finger from the operation protrusion is prevented even if the power source dial is pivoted. Moreover, the camera of the present invention has excellent operability in comparison with a conventional camera in which a finger is moved along a straight ridgeline and operates a setting dial so as to turn on/off the power source.

In addition, it is preferable that the camera of the present invention includes a click spring for elastically engaging with the power source dial in both the cases where the power source dial is in a power source-on position and in a power source-off position.

When such a click spring is provided, the power source dial can be stabilized in both the power source-on and power source-off positions. Thereby, it is possible to prevent the power source from being turned on accidentally at the time of disuse or the power source from being turned off accidentally when the shutter button is intended to be pushed down at the time of photographing.

In addition, it is preferable that the camera of the present invention includes: a photographing lens; and a lens barrier member for covering a front surface of the photographing lens so as to be freely opened and closed, wherein the lens barrier member is mechanically connected with the power source dial, and the power source dial retreats from the front surface of the photographing lens interlocked with the pivoting movement of the power source dial to the power source-on position and covers the front surface of the photographing lens interlocked with the pivoting movement of the power source dial to the power source-off position.

When such a lens barrier member is provided, the lens barrier member retreats from the front surface of the photographing lens and covers the front surface of the photographing lens in accordance with the pivoting operations of the power source dial to the power source-on position and to the power source-off position. Therefore, it is not necessary to open and close the lens barrier independently from the on/off operation of the power source, and thus the operability is improved from this point also. Moreover, the lens barrier member is mechanically connected with the power source dial, and thus it is not necessary to provide a power source for opening and closing the lens barrier.

Further, it is preferable that in the camera of the present invention, the shutter button is provided so that its upper surface is in a position which is lower than the upper surface of the power source dial.

With this structure, the shutter button is prevented from being pushed down accidentally.

As explained above, according to the present invention, the small camera which has excellent operability can be provided. Moreover, the shutter lock at the time of disuse can be realized without providing a special lock mechanism.

DESCRIPTION OF THE PREFERRED EMBODIMENT

There will be explained below embodiments of the present invention.

Figure 1:
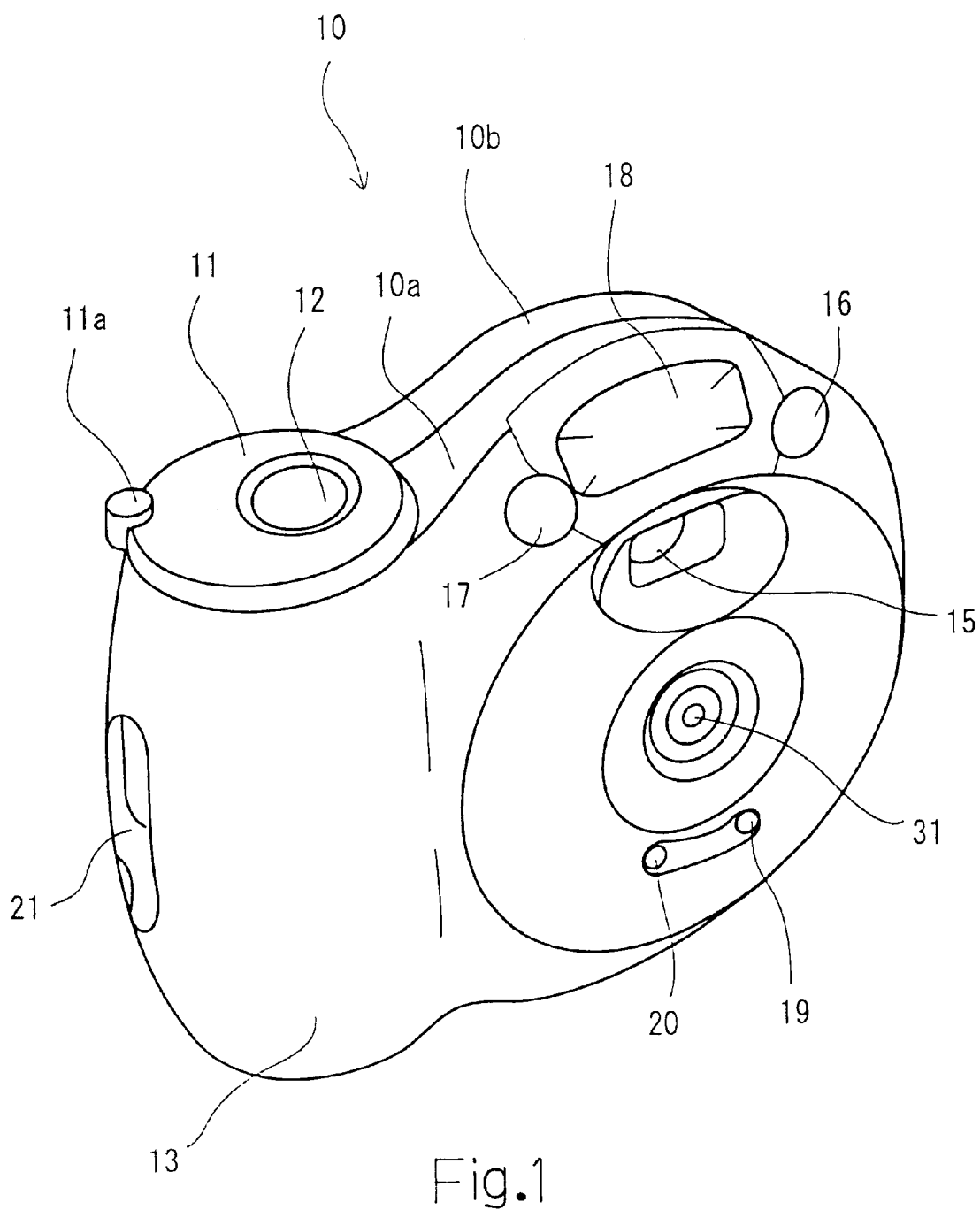
FIG. 1 is an appearance perspective view in which a front surface of a camera according to one embodiment of the present invention is viewed diagonally from above and a power source is in an off state.

FIG. 1 is an appearance perspective view in which a front surface of a camera according to one embodiment of the present invention is viewed diagonally from above and an power source is in an off state.

The camera 10 is a comparatively small camera which composes a photograph system called as an advanced photo system (APS), and a lighttight cartridge which is dedicated to APS is used in the camera 10. The camera 10 has a front cover 10a and a rear cover 10b.

An upper surface of the camera 10 is provided with a power source dial 11 which turns on/off a power source upon a pivoting operation.

In addition, the camera 10 is provided with a shutter button 12 which is surrounded by the power source dial 11 and also is arranged in a position closer to a front side of the camera 10 than a pivoting center of the power source dial 11 and pivots on the pivoting center of the power source dial 11 upon the pivoting of the power source dial 11. Here, the shutter button 12 is arranged so that its upper surface is in a position which is lower than an upper surface of the power source dial 11. As a result, accidental pushing is prevented.

Further, the camera 10 is provided with an approximately cylindrical grip section 13 which extends up and down, and the power source dial 11 is arranged on an upper surface of the grip section 13. Moreover, the power source dial 11 has an operation protrusion 11a which protrudes further than the cylindrical outer edge of the grip section 13 and rotates the power source dial 11.

In addition, a front center portion of the camera 10 is provided with a lens barrier member 14 for covering a photographing lens 31 (see FIG. 3) when the power source is off. A front upper portion of the camera 10 is disposed with a finder objective window 15, an AF projecting window 16 for active autofocus (AF), an AF light receiving window 17 and a flash light emitting section 18. Moreover, a front lower portion of the camera 10 is provided with an AE light receiving window 19 for measuring a brightness of an object and a self window 20 which contains a light emitting element for emitting a light at the time of selftimer photographing.

Further, in the camera 10, the inside of the grip section 13 is provided with a cartridge loading chamber 41 (see FIG. 4) for loading an APS film cartridge, and an operation tab 21 for opening a cartridge cover arranged on a bottom section of the camera 10. A user operates the operation tab 21 so as to open the cartridge cover and loads the cartridge loading chamber 41 with the APS film cartridge and closes the cartridge cover thereafter.

Figure 2:
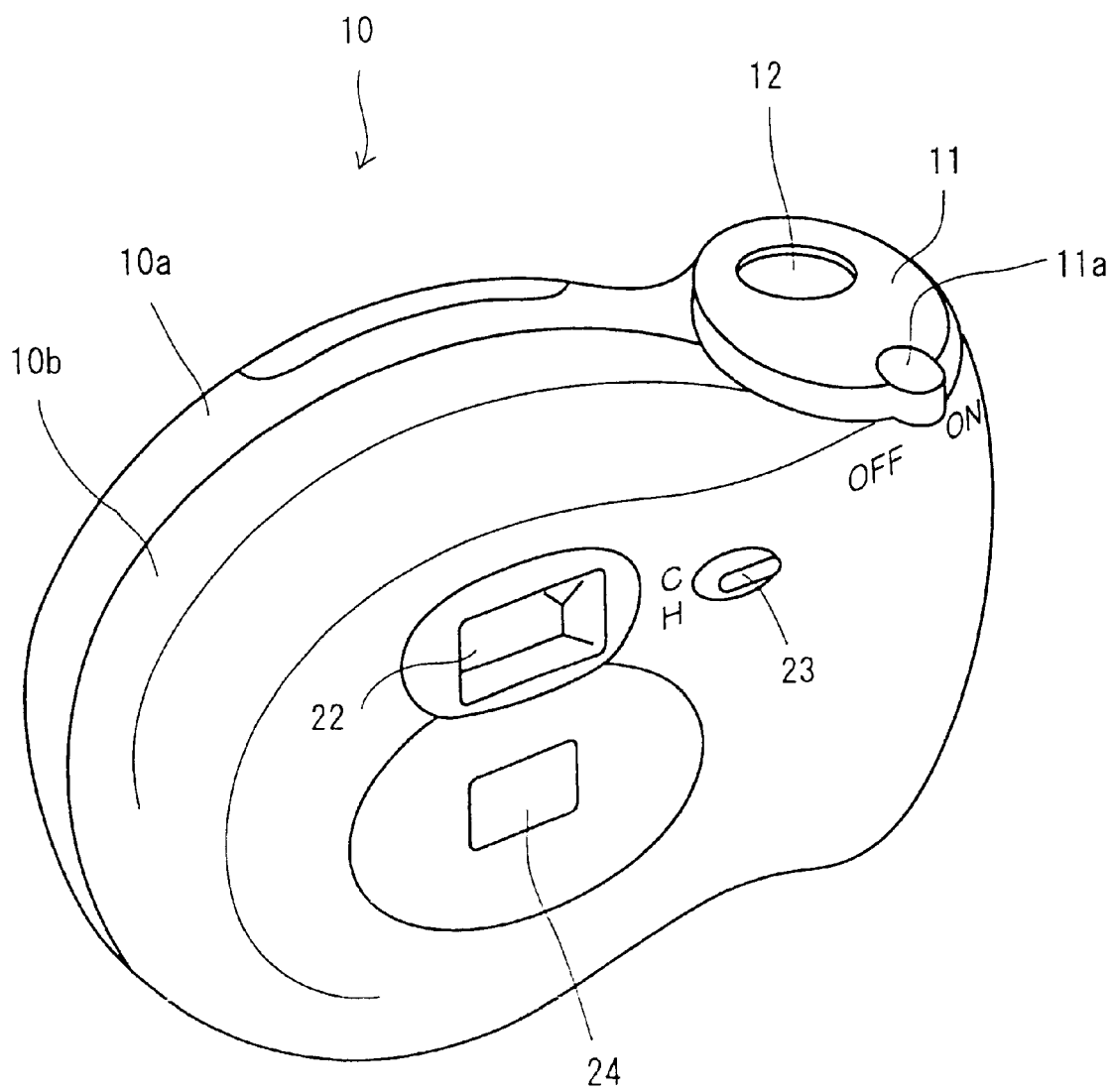
FIG. 2 is an appearance perspective view in which a back surface of the camera of FIG. 1 is viewed diagonally from above.

FIG. 2 is an appearance perspective view in which the back surface of the camera in FIG. 1 is viewed diagonally from above.

The back surface of the camera 10 is provided with a finder eyepiece window 22. Moreover, a right side of the finder eyepiece window 22 is provided with a print type switching tab 23 for switching between two type print frames of C (conventional) and H (high vision). Further, a lower side of the finder eyepiece window 22 is provided with a liquid crystal display section 24 for displaying necessary information (photographing mode, film counter and the like). Moreover, a word "OFF" which shows that the power source dial 11 is in a power source-off position and a word "ON" which shows that the power source dial 11 is in a power source-on position are printed on an upper right portion on the back surface of the camera 10.

Figure 3:
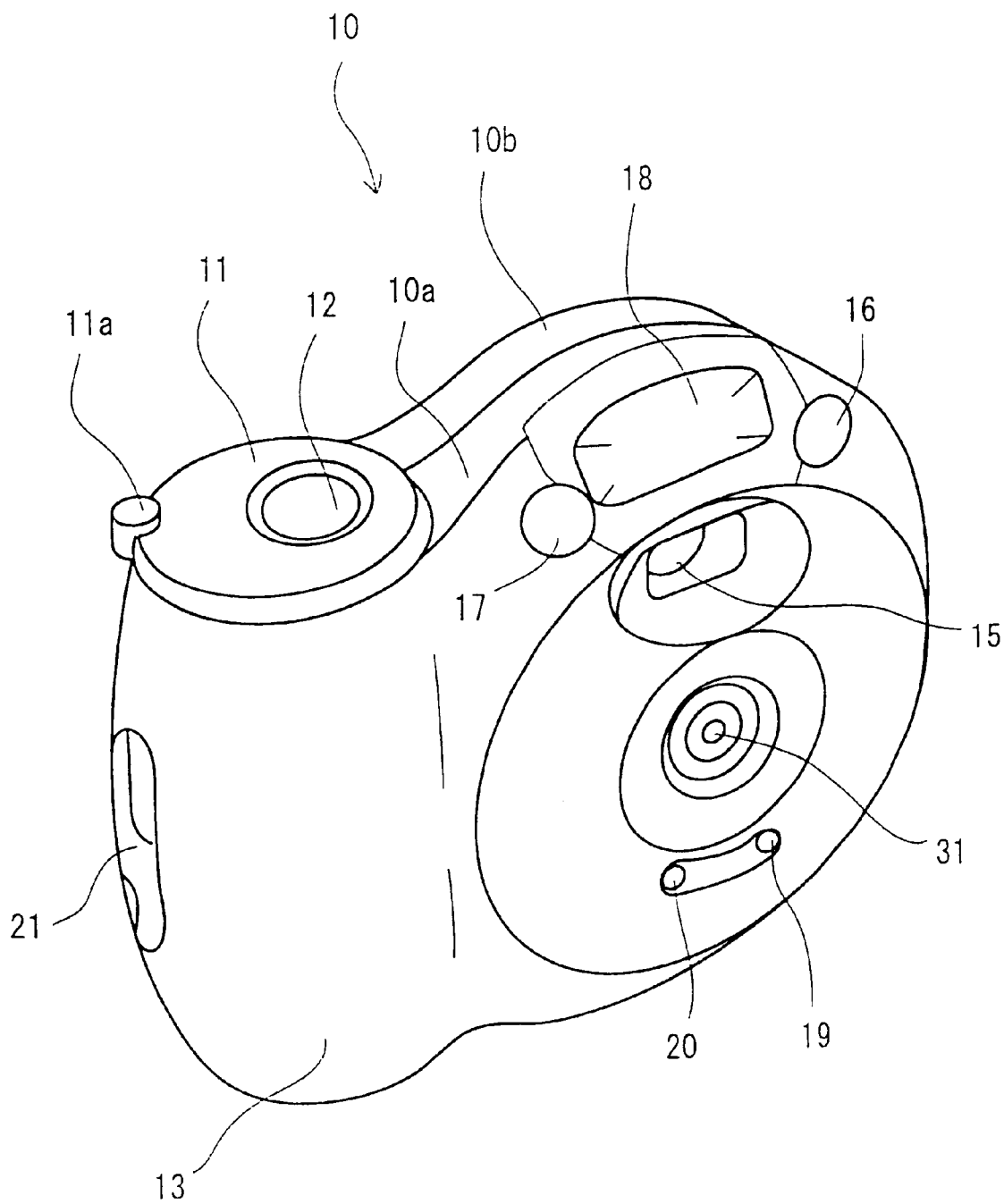
FIG. 3 is an appearance perspective view in which the front surface of the camera is viewed diagonally from above and a power source dial is pivoted to a power source-on position.

FIG. 3 is an appearance perspective view in which the front of the camera shown in FIG. 1 is viewed diagonally from above and the power source dial is pivoted to the power source-on position.

In the case where photography is executed by the camera 10, the operation protrusion 11a is operated to a foreground direction of FIG. 3 so as to pivot the power source dial 11. The shutter button 12 pivots on the pivoting center of the power source dial 11 upon the pivoting of the power source dial 11. The shutter button 12 maintains its position close to the front side of the camera 10 and simultaneously pivots to a foreground direction in FIG. 3. Moreover, the lens barrier member 14 moves to a lower left direction of FIG. 3, and as a result the front surface of the photographing lens 31 is opened. In such a manner, the power source of the camera 10 is turned on so that the photographing is prepared, and the shutter button 12 is pushed down.

In the camera 10 of the present embodiment, since the shutter button 12 is provided in the position closer to the front side of the camera 10 than the pivoting center of the power source dial 11, a position of a finger for pushing down the shutter button 12 is also a front side of the camera. As a result, even if the small-size camera 10, the shutter button 12 can be pushed down easily. Therefore, a shake which easily occurs in the small camera 10 can be reduced.

In addition, since the power source dial 11 has the operation protrusion 11a which protrudes further than the cylindrical outer edge of the grip section 13 and rotates the power source dial 11, when a finger is moved along the ridgeline of the upper end of the grip section 13, the catch between the finger and the operation protrusion 11a is maintained continuously and naturally. As a result, even if the power source dial 11 is pivoted, releasing of the finger from the operation protrusion 11a is prevented. Therefore, in comparison with a conventional camera in which a finger is moved along a straight ridgeline and operates a setting dial so as to turn the power source on/off, the camera of the present invention has good operability.

Figure 4:
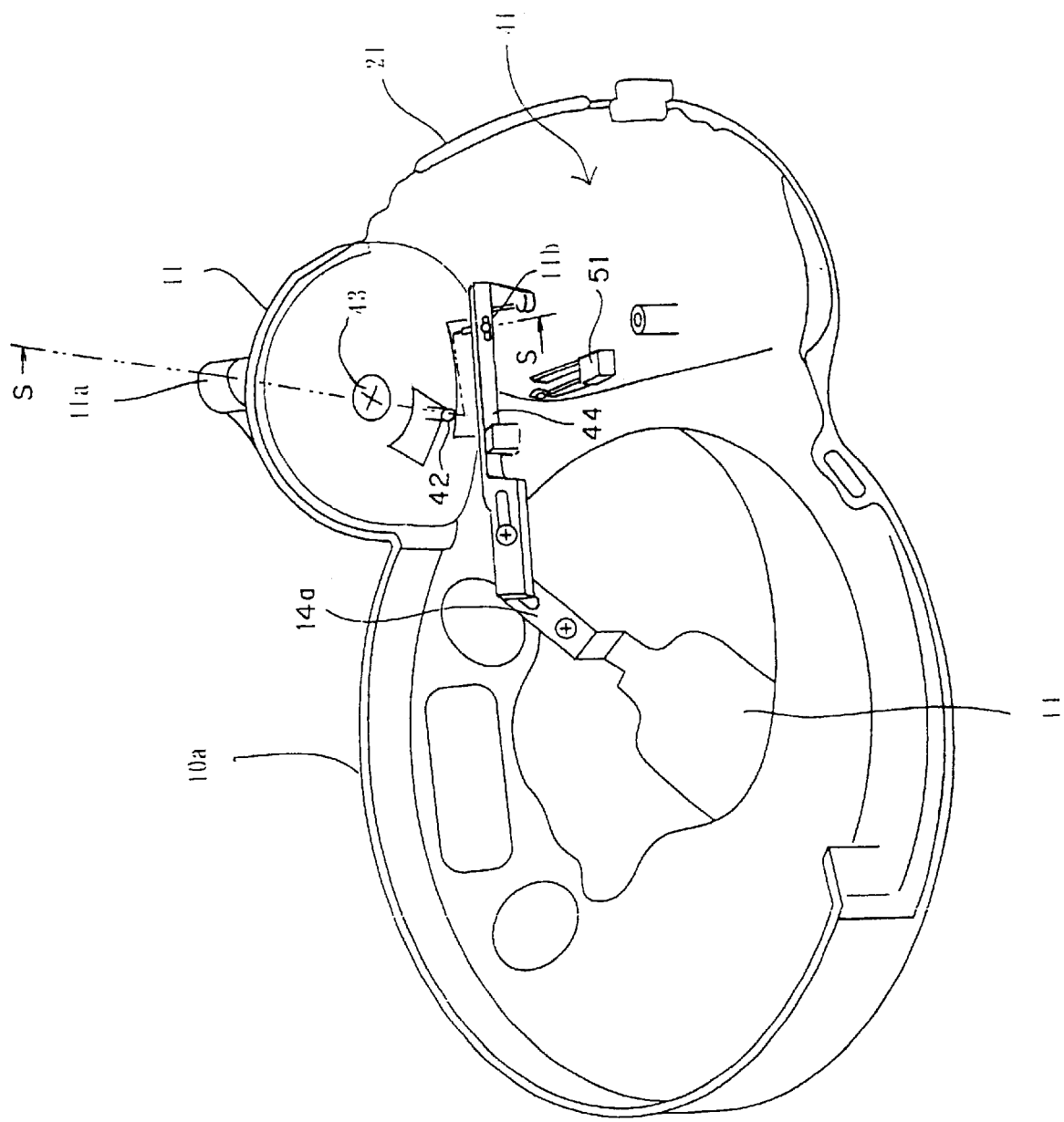
FIG. 4 is a perspective view in which a front cover of the camera shown in FIG. 1 is viewed from the inside of the camera and the power source is in the off state.
Figure 5:
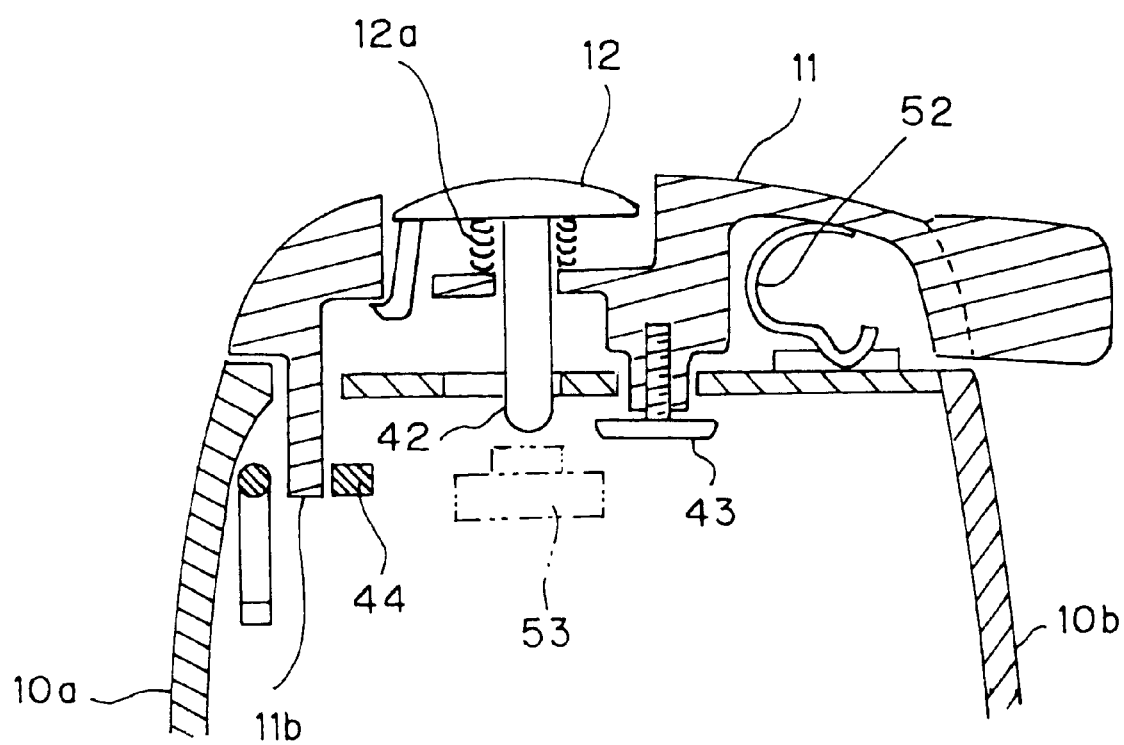
FIG. 5 is a cross sectional view taken along line S—S of the camera in FIG. 4.

FIG. 4 is a perspective view in which the front cover of the camera in FIG. 1 is viewed from the inside of the camera and the power source is in the off state. Moreover, FIG. 5 is a cross sectional view taken along line S—S of the camera in FIG. 4.

FIG. 4 shows the above-mentioned cartridge loading chamber 41, and the power source dial 11 held by a screw 43. Also, FIG. 4 shows a power source switch 51, and a protrusion 42. The power source switch 51 is turned on when the power source dial 11 is pivoted to the power source-on position, and transmits a signal to an MPU (microprocessor unit) mounted to a circuit substrate, not shown. The protrusion 42 which operates a release switch 53 mounted to the circuit substrate (corresponding to the shutter release member of the present invention; see FIG. 5) which is affected by the pushing-down of the shutter button 12 and free from the effect due to the pushing-down of the shutter button 12 when the power source dial 11 is pivoted to the power source-off position. A claw section of the shutter button 12 is held by the power source dial 11, and as a result the shutter button 12 and the power source dial 11 are composed as a unit. When the power source dial 11 pivots, accordingly the shutter button 12 also pivots on the pivoting center of the power source dial 11. More specifically, on the shutter button 12, the protrusion 42 is formed and the above-mentioned release switch 53 is provided below the power source dial 11. When the power source dial 11 is pivoted to the power source-on position, the release switch 53 is turned on by the protrusion 42 upon the pushing-down of the shutter button 12. Meanwhile, when the shutter button 12 is pushed down in the case where the power source dial 11 is in the power source-off position, the protrusion 42 comes in contact with a section of the circuit substrate where electronic parts including the release switch 53 are not mounted. Therefore, the engagement of the shutter button 12 with the release switch 53 is released, and the shutter lock at the time of disuse is realized without providing a special lock mechanism.

In addition, on the power source dial 11, a fitting protrusion 11b is formed and the fitting protrusion 11b is fitted into one end of a connecting member 44. A boss (not shown) provided at the other end of the connecting member 44 is engaged with a fork-shaped section 14a provided on the lens barrier member 14.

In such a manner, the lens barrier member 14 is mechanically connected with the power source dial 11, and the lens barrier member 14 is moved via the connecting member 44 upon the pivoting of the power source dial 11. As a result, the front surface of the photographing lens 31 is covered by the lens barrier member 14 so as to be freely opened.

In FIG. 4, the power source dial 11 is in the power source-off position, and thus even in the case where the shutter button 12 is pushed down, the shutter-on of the camera 10 is forbidden by the above-mentioned shutter lock mechanism. Moreover, the connecting member 44 which is fitted to the fitting protrusion 11b of the power source dial 11 is in a state that it is moved to the right direction of FIG. 4, and accordingly the lens barrier member 14 is moved to the left direction. For this reason, the front surface of the photographing lens 31 is covered by the lens barrier member 14.

FIG. 5 shows a click spring 52 which is elastically engaged with and stabilizes the power source dial 11 even when the power source dial 11 is in both the on and off positions, and a shutter button spring 12a which returns the pushed shutter button 12 to the original position. Moreover, FIG. 5 shows the above-mentioned protrusion 42 and the release switch 53.

Figure 6:
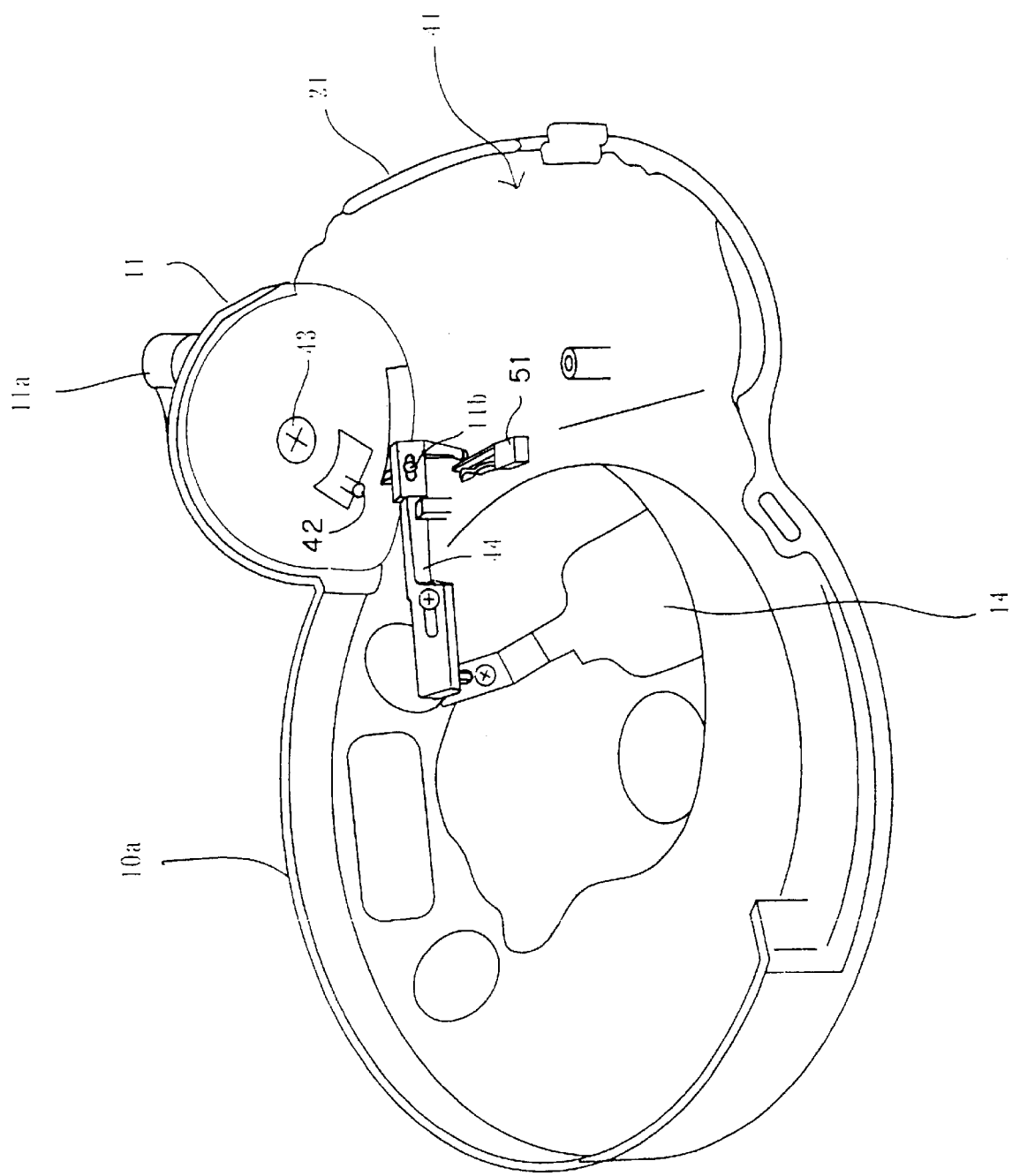
FIG. 6 is a perspective view in which the front cover of the camera shown in FIG. 1 is viewed from the inside of the camera and the power source is in an on state.
Figure 7:
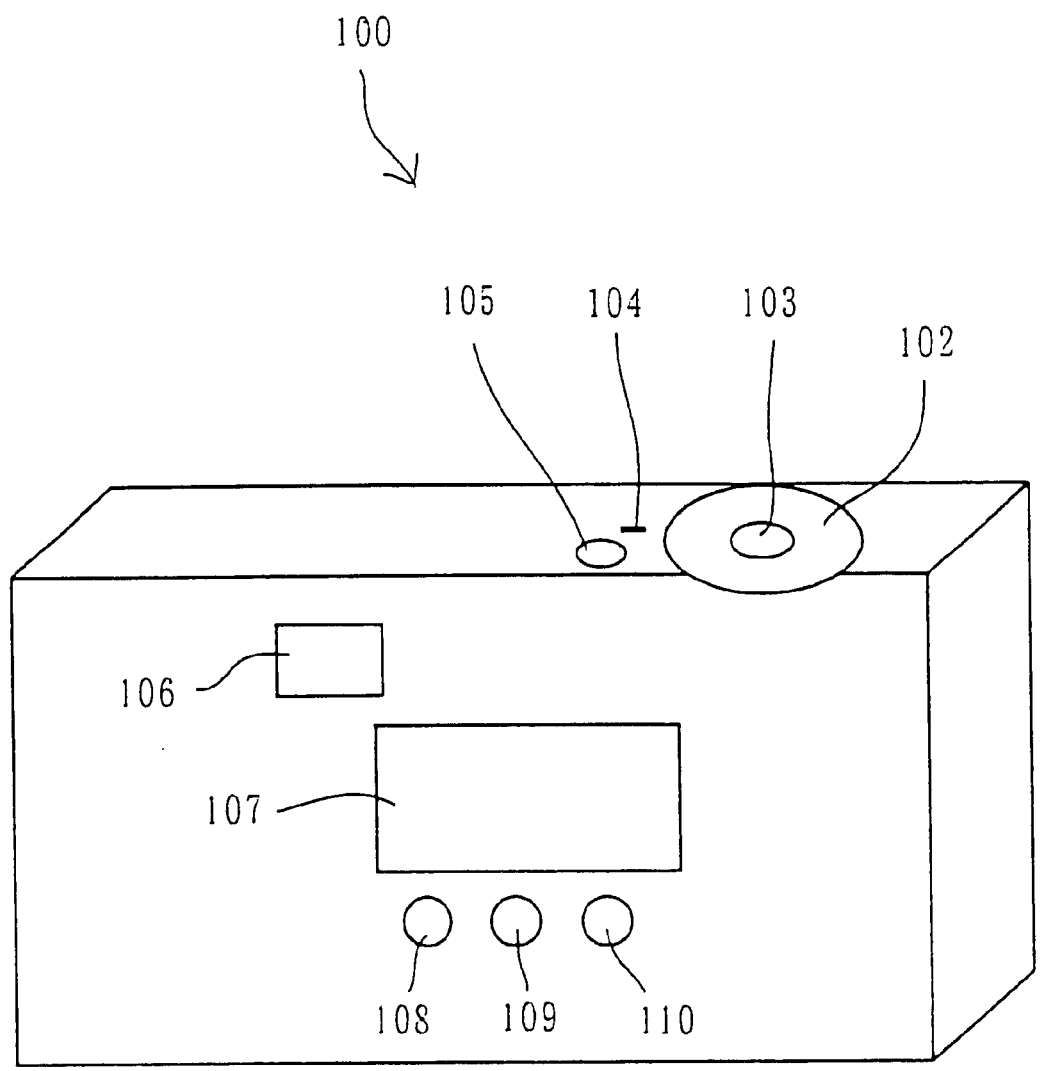
FIG. 7 is an appearance perspective view in which a camera suggested in Japanese Patent Application Laid-Open No. 11-258670 (1999) is viewed from a direction where a back surface and an upper surface appear.

FIG. 6 is a perspective view in which the front cover of the camera shown in FIG. 1 is viewed from the inside of the camera and the power source is in the on state.

In FIG. 6, the power source dial 11 is in the state that it is pivoted to the power source-on position, and accordingly the shutter button 12 is pivoted. Moreover, the power source switch 51 is in the on state, and accordingly the power source of the camera 10 is turned on via the MPU. Further, the protrusion 42 pivots to the upper left direction in FIG. 6 and is positioned just above the release switch 53 (see FIG. 5) mounted to the circuit substrate. Moreover, the connecting member 44 is moved to the left direction in FIG. 4 by the pivoting of the power source dial 11, and accordingly the lens barrier member 14 is moved to the right direction. For this reason, the front surface of the photographing lens 31 is in the opened state.

Here, the shutter button 12 is pushed down. As a result, the protrusion 42 pushes down the release switch 53. In such a manner, the shutter button 12 is engaged with the release switch 53 at the time of the on state of the power source. As a result, information about the releasing switch 53 being on is input into an input port of the MPU, not shown, and a predetermined routine is executed so that photography is carried out.

The present embodiment exemplified the release switch 53 mounted to the circuit substrate as the shutter release member of the present invention, but this member is not limited to this and may be composed of a mechanical latch mechanism.

In addition, the present embodiment explained the example that the present invention is applied to the comparative small camera which composes a photograph system called as the advanced photo system (APS), but the present invention is not limited to this. Therefore, the present invention may be applied to a normal camera for photographing using a photo film of 35 mm roll shape, or the present invention may be applied to an electronic steel camera which images an image of an object on a CCD element and captures the image as a signal or to an instant camera which carries a film out of the camera and develops the film.

What is claimed is:

1. A camera for photographing in response to a photographing operation, comprising:

a power source dial provided on an upper surface of the camera for turning on/off a power source upon a pivoting operation; and a shutter button surrounded by the power source dial and provided in a position closer to a front side of the camera than a pivoting center of the power source dial, the shutter button pivoting on the pivoting center of the power source dial upon the pivoting of the power source dial.

2. The camera according to claim 1, further comprising a shutter release member which is affected by pushing-down of the shutter button when the power source dial is pivoted to a power source-on position, and free from the effect due to the pushing-down of the shutter button when the power source dial is pivoted to a power source-off position.

3. The camera according to claim 1, further comprising:

an approximately cylindrical grip section which extends up and down, wherein the power source dial is arranged on an upper surface of the grip section, wherein the power source dial has an operation protrusion which protrudes further than a cylindrical outer edge of the grip section and rotates the power source dial.

4. The camera according to claim 1, further comprising a click spring for elastically engaging with the power source dial in both the cases where the power source dial is in a power source-on position and in a power source-off position.

5. The camera according to claim 1, further comprising a photographing lens; and a lens barrier member for covering a front surface of the photographing lens so as to be freely opened and closed, wherein the lens barrier member is mechanically connected with the power source dial, and the power source dial retreats from the front surface of the photographing lens interlocked with the pivoting movement of the power source dial to the power source-on position and covers the front surface of the photographing lens interlocked with the pivoting movement of the power source dial to the power source-off position.

6. The camera according to claim 1, wherein the shutter button is provided so that its upper surface is in a position which is lower than the upper surface of the power source dial.

* * * * *